United States Patent [19]

Mortimer et al.

[11] 4,046,731

[45] Sept. 6, 1977

[54] PROCESS FOR PREPARING DOPES FROM WHICH SHAPED ARTICLES OF OXADIAZOLE/N-ALKYLHYDRAZIDE COPOLYMERS ARE OBTAINED

[75] Inventors: George A. Mortimer; Chris A. Pelezo, both of Pensacola; John C. Richardson, Cantonment, all of Fla.

[73] Assignee: Monsanto Company, St. Louis, Mo.

[21] Appl. No.: 686,207

[22] Filed: May 13, 1976

[51] Int. Cl.$^2$ .......................... G08K 3/30; C08K 3/52; C08K 5/42
[52] U.S. Cl. .......................... 260/30.6 R; 260/30.8 R; 260/33.4 R; 260/78.41; 528/499
[58] Field of Search ..................... 260/30.8 R, 30.6 R, 260/78.41

[56] References Cited

U.S. PATENT DOCUMENTS 3,886,251   5/1975   Sekiguchi et al. ................. 264/184

FOREIGN PATENT DOCUMENTS 1,407,439   9/1975   United Kingdom
1,417,568   10/1975  United Kingdom

OTHER PUBLICATIONS

Journel of Polymer Science, Part A, vol. 2, pp. 1137-1144 (1964).

Primary Examiner—Stanford M. Levin
Attorney, Agent, or Firm—John W. Whisler

[57] ABSTRACT

Dopes from which shaped articles of oxadiazole/N-alkylhydrazide copolymers are provided. The dopes are prepared in a matter of minutes by combining and mixing a slurry of aromatic dihydrazide in aromatic diester with a mineral acid such as oleum.

8 Claims, No Drawings

PROCESS FOR PREPARING DOPES FROM WHICH SHAPED ARTICLES OF OXADIAZOLE/N-ALKYLHYDRAZIDE COPOLYMERS ARE OBTAINED

BACKGROUND OF THE INVENTION

A. Field of the Invention

This invention relates to a novel process for preparing dopes from which certain aromatic oxadiazole/N-alkylhydrazide copolymers may be isolated.

The dopes comprise a strong mineral acid (e.g. oleum) and a fiber-forming copolymer (hereinafter referred to as "Copolymer A") consisting essentially of recurring units (I) of the formula

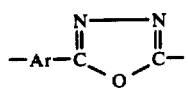

and units (II) of the formula

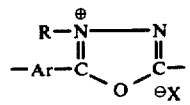

in a mole ratio of between about 20:80 and 95:5, respectively, wherein $-X$ is an anion present in said acid, such as $-HSO_4$, $-HS_2O_7$, $-H_2PO_4$, $-H_3P_2O_7$, $-Cl$ and the like, Ar is an aromatic radical and R is an $C_1$ to $C_4$ alkyl. When the dope is combined with an aqueous medium, units (II) of Copolymer A hydrolyze to form units (III) of the formula

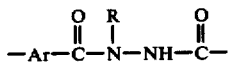

and the resulting aromatic oxadiazole/N-alkylhydrazide copolymer (hereinafter referred to as "Copolymer B") precipitates or coagulates.

B. Description of the Prior Art

A process for preparing dopes from which shaped articles of Copolymer B can be made is described in British Pat. No. 1,407,439. The process involves mixing appropriate amounts of monomers consisting of an aromatic dicarboxylic acid, a dialkyl ester of an aromatic dicarboxylic acid and hydrazine sulfate in fuming sulfuric acid (oleum) at a temperature below which substantial polymerization of the monomers occurs, for example at 60° C., until a solution of the monomers is formed. Dissolution of these monomers in oleum usually requires from 4 to 18 hours. The monomer solution is then heated at a temperature ranging from 125° C. to 150° C. for from 4 to 6 hours to polymerize the monomers and obtain a dope comprising Copolymer A in oleum.

The dope, after being diluted and degassed, may be extruded into an aqueous medium to provide fibers of Copolymer B by art-recognized solution spinning techniques, such as, by the technique described in British Pat. No. 1,417,568. The dope may also be used to cast films or provide coatings of Copolymer B.

The above-described process for preparing Copolymer A dopes has several serious drawbacks from the standpoint of commercial operations, for example, the process consumes considerable time and energy. Another disadvantage is that, even after the monomers and oleum are mixed at 60° C. for several hours, undissolved monomer particles are nevertheless frequently present in the monomer solutions. When the monomer solutions are subsequently heated and the monomers polymerized, these particles cause gel formation. The presence of gel in the dopes tends to cause extrusion difficulties and product deficiencies.

An object of the present invention is to provide a process for preparing Copolymer A dopes which avoids the problems of the above-described process.

Other objects and advantages of the invention will become apparent from the following detailed description thereof.

SUMMARY OF THE INVENTION

The process of the present invention provides an economical and commercially attractive process for preparing Copolymer A dopes from which Copolymer B may be isolated. In general, the process of the invention avoids the problems of the above-described process by utilizing certain monomers which rapidly dissolve in a strong mineral acid such as oleum in a matter of seconds to provide a particle-free solution which can be polymerized to a gel-free dope comprising Copolymer A. More specifically, the process of this invention comprises: (a) combining and rapidly mixing (i) a slurry of monomers consisting essentially of one or more dihydrazides in particulate form of the formula

(III)

in one or more diesters in the liquid state of the formula

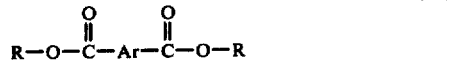

(IV), wherein the mole ratio of dihydrazide to diester is between about 1:1 to about 2:1, and (ii) an acid selected from the group consisting of oleum, chlorosulfonic acid and polyphosphoric acid, and mixtures thereof, whereby a monomer solution is formed and then (b) maintaining said monomer solution for a period of time at a temperature sufficient to polymerize said monomers, thereby obtaining a dope comprising fiber-forming Copolymer A in said acid.

Normally, the weight ratio of the slurry to acid ranges from about 2:98 to about 20:80 and the inherent viscosity of Copolymer A is between about 2 and 10.

Upon combining the slurry and acid, the dihydrazide and diester monomers dissolved in the acid in a matter of seconds (1–60 seconds) to provide a particle-free solution. An exotherm due to heat of solution and/or reaction immediately brings the ingredients to the temperature range desired for polymerization of the monomers, thereby eliminating or reducing the need for external heating of the solution. Polymerization of the monomers is then accomplished in a matter of minutes to provide a gel-free homogeneous acid solution of Copolymer A, commonly referred to as a dope.

Dopes prepared by the process of the present invention may be combined with an aqueous medium and shaped into articles of Copolymer B, such as fibers, films or coatings, by art-recognized solution techniques.

For example, the dopes may be spun into high strength fibers by the dry jet-wet spinning process described in British Pat. No. 1,417,568. The dopes may also be used to obtain Copolymer B in bulk form. In this instance, the dopes are combined with an aqueous medium, such as water, to casue precipitation or coagulation of Copolymer B. Copolymer B then may be isolated and dissolved in a suitable solvent, such as hexafluoroisopropanol, to provide a solution from which films or fibers may be shaped.

The process of this invention may be carried out continuously, such as would be required when shaped articles of Copolymer B are produced by continuous operations in which the preparation and extrusion of the dope are coupled or the process may be carried out by a batch operation such as is commonly employed where the preparation and extrusion of the dope are accomplished discontinuously.

DESCRIPTION OF THE PREFERRED EMBODIMENTS

Slurries useful in practicing the process of this invention consist of dihydrazide dispersed in diester in the liquid state. The slurries are prepared by combining and mixing one or more Formula III dihydrazide monomers in particulate form and one or more Formula IV diester monomers at a temperature above the melting point of the ester(s), preferably, in a mole ratio of about 1:1 to 1.05:1, respectively. Preferred slurries for use in practicing the invention are prepared using terephthaloyldihydrazide (TDH) and/or isophthaloyldihydrazide (IDH) as the dihydrazide monomer(s) and dimethylterephthalate (DMT) and/or dimethylisophthalate (DMI) as the diester monomer(s).

Acids useful in practicing the process of this invention are oleum, chlorosulfonic acid, polyphosphoric acid and mixtures thereof. When the monomer solutions are prepared using oleum or polyphosphoric, there of course must be present sufficient $SO_3$ in the case of oleum or $P_2O_5$ in the case of polyphosphoric to combine with the water formed when the monomers are polymerized in the acid. It is common to express the amount of $SO_3$ or $P_2O_5$ present in terms of utilization; for example, when using oleum, if there is just sufficient $SO_3$ present to combine with the water formed when the monomers are polymerized therein, the $SO_3$ utilization in this instance is 100%. On the other hand, if only 60% by weight of the $SO_3$ present in the oleum is used to combined with the water formed, the $SO_3$ utilization is 60%. Preferably the $SO_3$ or $P_2O_5$ utilization is between 10 and 90% with a utilization of between 30 and 80% being particularly preferred. The preferred acid for use in practicing the process of the invention is oleum due to its cost, availability, and low viscosity.

If desired, a methylating agent, such as an alcohol of the formula ROH where R is a $C_1$ to $C_4$ alkyl (e.g. methanol) or a $C_1$ to $C_4$ alkyl salt such as methyl sulfate or phosphate, and/or small amounts of a hydrazine salt, such as hydrazine sulfate, may be predissolved in the acid to control respectively, the proportion of units (III) in Copolymer B and the inherent viscosity of Copolymer A. The amount of methylating agent used may range from none to an amount sufficient to provide a mole ratio of alkylating agent to Formula (III) dihydrazide compound(s) of about 5:1. The amount of hydrazine salt used may range from none to about 1/10 the molar amount of dihydrazide monomer(s) used.

Upon combining and mixing the slurry and acid, the monomers normally dissolve in the acid in a matter of 2 to 15 seconds to provide a particle-free solution. An exotherm due to the heat of solution quickly brings the solution temperature close to the temperature range desired for polymerization of the monomers. In the case of monomer solutions in which the solvent is oleum, the desired temperature range is preferably between about 140° C. and 180° C.; in the case where the solvent is chlorosulfonic acid, the temperature range is preferably between about 100° C. and 180° C.; and in the case where the solvent is polyphosphoric acid, the temperature range is preferably between about 160° C. and 225° C. Polymerization of the monomers then occurs in a matter of minutes to provide a gel-free dope comprising the acid and Copolymer A having an inherent viscosity of between about 2 and 10. Normally, it is not necessary to heat the dope or solution during polymerization. In fact, it may be necessary to cool the mixture so as to maintain the temperature within the appropriate abovementioned temperature range. The temperature of the slurry at the time it is combined with the acid will depend upon the ester monomer(s) used in its preparation. For example, DMT melts at 140° C., whereas DMI melts at 68° C. Preferably, the slurry is at a temperature below 180° C. so as to avoid any possible degradation of the monomers. If desired, the acid may be heated or cooled prior to combining it with the slurry. Preferably, the acid is at a temperature less than 100° C. at the time it is combined with the slurry.

Mixing of the ingredients is preferably accomplished by means sufficient to provide intimate high speed blending of the ingredients. Conventional means may be used for this purpose.

In general, the inherent viscosity of Copolymer A in the dope increases with increasing amounts of excess dihydrazide monomer(s) present in the slurry. Alternatively, a hydrazine salt may be used to increase viscosity. Inherent viscosity ($\eta_{inh}$) values, when given herein, are measured at 25° C. and are defined by the following equation:

$$\eta_{inh} = \frac{\ln RV}{C}$$

where C represents a solids concentration of 0.2 gram of Copolymer A per 100 ml of concentrated sulfuric acid, as solvent, and RV represents relative viscosity. The relative viscosity (RV) is determined by dividing the flow time in a capillary viscometer of a dilute Copolymer A solution by the flow time for pure solvent. The solids concentration of the dope is calculated and then a portion or sample of this dope is diluted with an appropriate amount of concentrated sulfuric acid to obtain a solution having a solids concentration of 0.2 g of Copolymer A per 100 ml of concentrated sulfuric acid. Brookfield viscosity values, when given herein, are measured at 25° C. by conventional techniques.

In general, the mole ratio of units (I) (i.e.

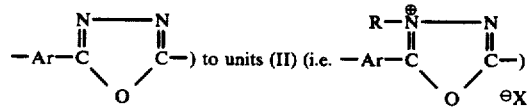

in Copolymer A decreases as the polymerization time increases and as the amount of alcohol or alkyl salt increases. The reason for this is that initially a homopolymer consisting of units (I) is rapidly formed which is then alkylated with time to yield Copolymer A.

In general, as the mole ratio of $SO_3$ or $P_2O_5$ to total monomer(s) increases, the viscosities of the dope and Copolymer A also increase. Normally, the Brookfield viscosity of dopes prepared by the process of this invention will be in the range of from 8,000 to 80,000 poise.

The following examples are given to further illustrate the invention and the application thereof.

EXAMPLE 1

This example describes continuously preparing Copolymer A dope by the process of the present invention using oleum and an $SO_3$ utilization of 65%.

In preparing the dope a stainless steel reaction system is employed. The reactor consists of a jacketed, temperature-controlled 2.5 cm. diameter pipe, 30 cm. long, containing low pressure drop mixing elements of the type described in U.S. Pat. No. 3,286,992 so as to obtain good heat transfer and plug flow. The reactor outlet is connected to a dope catch vessel by means of an automatic pressure control valve. The reactor inlet is connected to a 37 cm³ volume mixing chamber containing a high speed, high shear mixing head. This chamber is jacketed for temperature control. An oleum reservoir is connected to the mixing chamber by means of a metering pump. A pressurizable, temperature-controlled slurry reservoir containing an efficient homogenizer is connected to the mixing chamber by means of a heated slurry pump and transfer lines. Initially, 25% oleum (i.e. fuming sulfuric acid containing on a weight basis 30% dissolved $SO_3$) at ambient temperature is pumped from the oleum reservoir through the mixing chamber to the reactor at a rate of approximately 26 ml/min. under 260 psig back pressure. A homogeneous slurry of terephthaloyl dihydrazide (TDH) in dimethyl isophthalate (DMI) at 90° C. is pumped from the slurry reservoir (pressurized to 260 psig with nitrogen) through the mixing chamber to the reactor at a rate of approximately 3 ml/min. The TDH/DMI mole ratio in the slurry is 1.03 to 1. Immediately, the temperature in the mixing chamber rises and is controlled by the jacket temperature. After approximately one hour, the temperatures in the system become steady state at roughly 170° C. in both the mixing chamber and the reactor. A sample of the clear viscous dope taken from the dope catch vessel contains Copolymer A having an inherent viscosity of 3.6. A film of Copolymer B cast in water from the dope and washed with $Na_2CO_3$ and water is clear and tough. The NMR spectrum of a solution of a piece of the Copolymer B film in hexafluoroisopropanol indicates that 29% of the linkages between phenylene groups of this Copolymer B are methylhydrazide and 71% are 1,3,4-oxadiazole.

The flow rates of the feed streams to the mixing chamber are then changed to provide for a slurry feed rate of approximately 2.0 ml/min. and an oleum feed rate of 10 ml/min. The reactor is controlled at 160° C. and the mixer is left at 170° C. In this instance, the resulting dope contains Copolymer A having an inherent viscosity of 3.4. A film of Copolymer B is then cast from this dope as described above. In this instance, the NMR spectrum of a solution of a piece of this film in hexafluoroisopropanol indicates that 46% of the linkages between phenylene groups of this Copolymer B are methylhydrazide linkages and 54% are 1,3,4-oxadiazole linkages.

When the outlet of the reactor is connected to a spinneret instead of the dope catch vessel, fibers of Copolymer B may be provided by utilizing the solution spinning technique described in British Pat. No. 1,417,568.

EXAMPLE 2

In this example the same equipment and general procedure is used in preparing Copolymer A dope as described in example 1, except that a 145° C. slurry of terephthaloyl dihydrazide (TDH) in dimethyl terephthalate (DMT) (mole ratio of 1.00 ) is used instead of the slurry described in example 1.

The flow rate of the slurry is about 2.8 ml/min. 20% oleum cooled to approximately 10° C. is fed to the mixing head at the rate of about 35 ml/min. With cooling, the temperature of the mixing head is adjusted to 170° C. The reactor temperature is also 170° C. A sample of the clear viscous dope taken from the dope catch vessel contains Copolymer A having an inherent viscosity of 1.8. Copolymer B film prepared as described in example 1 from the dope indicates that 75% of the linkages between the phenylene groups of this Copolymer B are 1,3,4-oxadiazole. Then, small amounts of hydrazine sulfate and methyl sulfate dissolved in oleum are incrementally added to the oleum reservoir until the inherent viscosity of Copolymer A of the dope lines out at 3.2 and the percent 1,3,4-oxadiazole linkages in Copolymer B film prepared from the dope is 50%.

We claim:

1. A process for preparing a dope comprising an acid and a copolymer consisting essentially of recurring units (I) of the formula

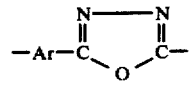

and recurring units (II) of the formula

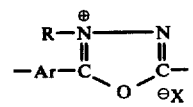

wherein the mole ratio of units I and II is between 20:80 and 95:5, consisting of a. combining and mixing (i) a slurry of monomers consisting essentially of one or more dihydrazides in particulate form of the formula

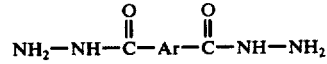

in one or more diesters in the liquid state of the formula

wherein the mole ratio of dihydrazide to diester is between about 1:1 and about 2:1, and (ii) and acid selected from the group consisting of oleum, chlorosulfonic acid, polyphosphoric acid, and mixtures thereof, whereby a monomer solution is formed, and then b. maintaining said monomer solution for a period of time at a temperature sufficient to polymerize said monomers, thereby obtaining a dope comprising said fiber-forming copolymer in said acid, wherein Ar represents a divalent aromatic radical, R represents a $C_1$ to $C_4$ alkyl, and $^\ominus X$ represents an anion present in said acid.

2. The process of claim 1, wherein the weight ratio of slurry to acid is between 2:98 to 20:80.

3. The process of claim 1, wherein said acid contains an alkylating agent.

4. The process of claim 3, wherein the alkylating agent is of the formula ROH where R is a $C_1$ to $C_4$ alkyl.

5. The process of claim 1, wherein said acid is oleum containing $SO_3$ in a 20% to 70% by weight excess of the amount required to combine with the water formed when the monomers polymerize.

6. The process of claim 5, wherein the mole ratio of said dihydrazide to said diester is between about 1:1 to about 1.05:1.

7. The process of claim 6, wherein Ar is selected from the group consisting of

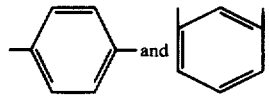

and R is — $CH_3$.

8. The process of claim 7, wherein Ar is

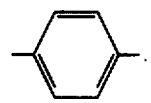

* * * * *